(12) United States Patent
Jeon et al.

(10) Patent No.: US 9,690,479 B2
(45) Date of Patent: Jun. 27, 2017

(54) METHOD AND APPARATUS FOR CONTROLLING APPLICATION USING KEY INPUTS OR COMBINATION THEREOF

(71) Applicant: Samsung Electronics Co., Ltd., Gyeonggi-do (KR)

(72) Inventors: Yongjoon Jeon, Gyeonggi-do (KR); Seungsoo Woo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 220 days.

(21) Appl. No.: 14/459,572

(22) Filed: Aug. 14, 2014

(65) Prior Publication Data
US 2015/0074575 A1   Mar. 12, 2015

(30) Foreign Application Priority Data
Sep. 12, 2013  (KR) ......................... 10-2013-0109600

(51) Int. Cl.
*G06F 3/048*   (2013.01)
*G06F 3/0488*  (2013.01)
*G06F 3/0481*  (2013.01)
*G06F 3/0484*  (2013.01)
*G06T 11/00*   (2006.01)

(52) U.S. Cl.
CPC ...... *G06F 3/04886* (2013.01); *G06F 3/04817* (2013.01); *G06F 3/04842* (2013.01); *G06F 3/04883* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 7,096,432 B2* | 8/2006 | Huapaya | G06F 3/0481 382/188 |
| 2008/0046755 A1* | 2/2008 | Hayes | G06F 9/54 713/187 |
| 2010/0122167 A1 | 5/2010 | Ryu | |
| 2010/0169818 A1* | 7/2010 | Hughes | G06F 3/0481 715/773 |
| 2014/0137020 A1* | 5/2014 | Sharma | G06F 3/0486 715/769 |

FOREIGN PATENT DOCUMENTS

KR   10-2006-0128576 A   12/2006

\* cited by examiner

*Primary Examiner* — Thanh Vu
(74) *Attorney, Agent, or Firm* — Cha & Reiter, LLC (57) ABSTRACT

A method and an apparatus for controlling an application using key inputs or a combination thereof. The apparatus may be implemented as, for example, a mobile terminal including a touch screen configured to display an icon corresponding to a first application under a display layer of a second application currently displayed on the touch screen, and a controller configured to execute the first application in response to detecting an input to the second application configured to execute the first application.

21 Claims, 10 Drawing Sheets

METHOD AND APPARATUS FOR CONTROLLING APPLICATION USING KEY INPUTS OR COMBINATION THEREOF

CROSS-REFERENCE TO RELATED APPLICATION

This application claims priority from and the benefit under 35 U.S.C. §119(a) of Korean Patent Application No. 10-2013-0109600, filed on Sep. 12, 2013, which is hereby incorporated by reference for all purposes as if fully set forth herein.

TECHNICAL FIELD

The present disclosure relates to a method and an apparatus for controlling an application. More particularly, the present disclosure relates to a method of controlling an application using key inputs or a combination thereof and an apparatus for supporting the same which can simply control an application according to key inputs which a user inputs on an execution screen of a keyboard application and a combination thereof.

BACKGROUND

Recently, with the development of digital technologies, various user devices including mobile communication electronic devices, Personal Digital Assistants (PDA), electronic organizers, smart phones, tablet Personal Computers (PC), and the like which can perform communication and personal information processing while being carried have come to market.

Through rapid development of these technologies, the user devices have various functions such as a video call function, an electronic organizer function, a photography function, an e-mail transmission/reception function, a broadcasting reproduction function, an internet function, a music reproduction function, a schedule management function, a Social Networking Service (SNS) function, a messenger function, a dictionary function, a game function, and the like in addition to a voice call function and a short message transmission function of the initial stage.

The aforementioned functions can be basically loaded when the user devices are manufactured, and users can download applications having new functions from application stores and additionally install them according to the user's needs.

For multi-tasking, applications may be divided into an application executed in the foreground and an application executed in the background.

SUMMARY

An aspect of the present disclosure is to provide a method and an apparatus for controlling an application, which can display an icon corresponding to at least one application on an area of an execution screen of a keyboard application, thereby improving intuitiveness of a user interface for displaying and controlling the application while the keyboard application is being executed. Here, at least one application which can be displayed on the execution screen of the keyboard application may include a background application, an application using a keyboard, a similar type of application, an application related to the currently running application, and the like.

In addition, another aspect of the present disclosure is to provide a method and an apparatus for controlling an application, which can simply and rapidly control the application corresponding to at least one icon displayed on the area of the execution screen of the keyboard application according to key inputs which a user inputs and a combination thereof, thereby improving user convenience.

Furthermore, another aspect of the present disclosure is to provide a method and an apparatus for controlling an application, which can map an application control command according to a trace of a user event input to the execution screen of the keyboard application, thereby implementing an identical control command with different key inputs or a combination thereof.

In accordance with one aspect of the present disclosure, a method of controlling an application using key inputs or a combination thereof is provided. The method includes: displaying on a display an icon corresponding to the first application under a display layer of a second application currently displayed on the display, and executing the first application in response to detecting an input to the second application configured to execute the first application.

In accordance with another aspect of the present disclosure, a method of controlling an application using key inputs or a combination thereof is provided. The method includes: displaying an icon on a display corresponding to the first application under a keyboard of a second application currently displayed on the display, detecting a touch gesture input to the icon, and executing at least one of a function of the keyboard and the first application according to the touch gesture.

In accordance with another aspect of the present disclosure, an apparatus for controlling an application using key inputs or a combination thereof is provided. The apparatus may be implemented as a mobile terminal including a touch screen configured to display an icon corresponding to a first application under a display layer of a second application currently displayed on the touch screen, and a controller configured to execute the first application in response to detecting an input to the second application configured to execute the first application.

In accordance with another aspect of the present disclosure, an apparatus for controlling an application using key inputs or a combination thereof is provided. The apparatus may be implemented as a mobile terminal including: a touch screen configured to display on a display an icon corresponding to a first application under a keyboard of a second application currently displayed on the display, and a controller configured to detect a touch gesture input to the icon, and execute at least one of a function of the keyboard and the first application according to the touch gesture.

As described above, according to the present disclosure, an icon corresponding to at least one first application is displayed on an area of a keyboard execution screen within an execution screen of a second application, thereby improving intuitiveness of a user interface for displaying and controlling the at least one first application while the second application is being executed.

Furthermore, according to the present disclosure, the first application corresponding to at least one icon displayed on the area of the keyboard execution screen within the execution screen of the first application can be simply and rapidly controlled according to key inputs which a user inputs and a combination thereof.

Accordingly, through the execution screen of the second application, a user can intuitively control the first application corresponding to the icon displayed on the execution screen of the second application, without passing through separate steps.

BRIEF DESCRIPTION OF THE DRAWINGS

The present disclosure will be more apparent from the following detailed description in conjunction with the accompanying drawings, in which.

DETAILED DESCRIPTION

In the present specification, an electronic device implies an information processing unit that can process data transmitted/received to/from an external device. The electronic device may display data stored therein or icons onto which various functions performed by the electronic device are mapped, respectively. Here, although including a computer, a notebook computer, a tablet PC, a mobile phone, and the like, the electronic device is not limited thereto.

In the present specification, a keyboard application may be automatically driven by a request of a user or execution of another specific application. The keyboard application outputs a keyboard configured with soft keys on a touch screen, and in the present disclosure, the keyboard has the same meaning as a keyboard execution screen without distinction therebetween.

In addition, in the present specification, an icon implies an image or symbol displayed on the screen of the electronic device for identification or execution of an application, a folder, or data. In this case, the icon may be displayed with an arbitrary shape or color or a combination thereof.

In the present specification, key inputs or a combination thereof implies a combination of keypad blocks on the keyboard application execution screen in an order in which the keypad blocks are pressed by a user event, and may be configured with alphabetical characters, Hangul characters, Chinese characters, Japanese characters, numbers, special characters, or the like. That is, it should be noted that the key inputs or the combination thereof includes numbers or special characters, and various characters without being limited to the Hangul characters, the alphabetical characters, or the like.

It is obvious that the present disclosure is not limited to the embodiments described below and may include various modifications without departing from the technical idea of the present disclosure. In describing the embodiments, descriptions of technologies which are already known to those skilled in the art and are not directly related to the present disclosure may be omitted.

Meanwhile, in the accompanying drawings, the same elements are indicated by the same reference numerals. For the same reason, in the accompanying drawings, some elements may be exaggerated, omitted, or schematically illustrated. This is in order to clearly describe the main idea of the present disclosure by omitting unnecessary description not relating to the main idea of the present disclosure. Hereinafter, embodiments of the present disclosure will be described in detail with reference to the accompanying drawings.

Figure 1:
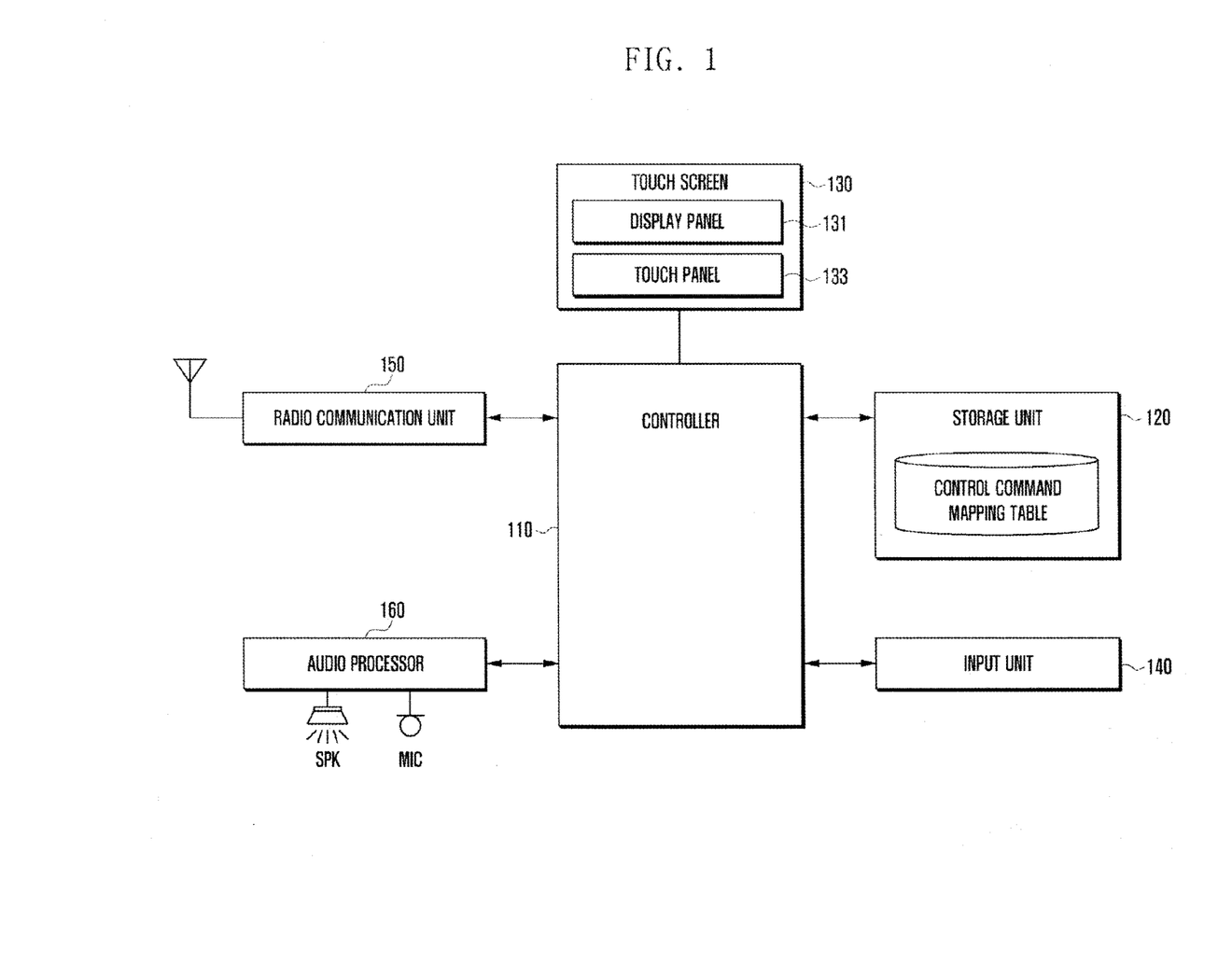
FIG. 1 is a block diagram illustrating an internal structure of an application control device or electronic device 100 using key inputs or a combination thereof according to an embodiment of the present disclosure.

FIG. 1 is a block diagram illustrating an internal structure of an application control device or electronic device 100 using key inputs or a combination thereof according to an embodiment of the present disclosure. Referring to FIG. 1, the electronic device 100 of the present disclosure may include a controller 110, a storage unit 120, a touch screen 130, an input unit 140, a radio communication unit 150, and an audio processor 160.

The input unit 140 receives a user input for controlling the electronic device 100 to generate an input signal, or generates a key signal related to function control of the electronic device 100 to transfer the generated key signal to the controller 110. The input unit 140 may be configured with a keypad including numeric keys and direction keys, and may be formed as a function key on a surface of the electronic device 100.

In particular, the input unit 140 of the present disclosure may transmit, to the controller 110, a signal for selecting a keyboard application, a signal for outputting icons corresponding to one or more applications displayed on at least some areas of the keyboard application execution screen, a command signal for controlling execution of the icons corresponding to the one or more applications displayed on at least some areas of the keyboard application execution screen, and a signal for changing a selection of the icons corresponding to the one or more applications displayed on at least some areas of the keyboard application execution screen, and the like.

The input unit 140 may be configured with any one or a combination of input means such as a button type keypad, a ball joystick, an optical joystick, a wheel key, a touch key, a touch pad, a touch screen, a mouse, and the like. In the embodiment of the present disclosure, the electronic device 100 may perform all manipulations with the touch screen. In this case, the touch screen 130 may perform a function of the input unit 140.

The radio communication unit 150 may support a radio communication function of the electronic device 100, and may be configured as a mobile communication module when the electronic device 100 supports a mobile communication function. To this end, the radio communication unit 150 may include a Radio Frequency (RF) transmitter for up-converting and amplifying a frequency of a radio signal to be transmitted, and an RF receiver for low-noise amplifying a radio signal to be received and down-converting a frequency of the received radio signal. Furthermore, when the electronic device 100 supports a short range radio communication function such as Wi-Fi communication, Bluetooth communication, Near Field Communication (NFC), or the like, the radio communication unit 150 may be configured as a Wi-Fi communication module, a Bluetooth communication module, an NFC communication module, or the like. In particular, the radio communication unit 150 according to the present disclosure may transmit a request for access to a specific webpage, and may download the webpage under the control of the controller 110. Furthermore, the radio communication unit 150 may receive or send a text message.

The audio processor 160 may be configured with acoustic components that transmits/receive an audio signal and perform encoding and decoding thereof. The audio processor 160 may include a codec, an audio amp, and the like. The audio processor 160 may be connected with a microphone (MIC) and a speaker (SPK). The audio processor 160 may bring a voice signal input from the microphone (MIC) into data to transmit the data to the controller 110, and may convert a voice signal input from the controller into an analog signal to output the analog signal through the speaker (SPK). Furthermore, the audio processor 160 may output, through the speaker (SPK), various audio signals (e.g., an audio signal according to reproduction of an MP3 file, a video file, or the like) generated by the electronic device 100.

In particular, the audio processor 160 according to the present disclosure may output a sound effect for notifying a selection of icons corresponding to one or more applications displayed on a keyboard application execution screen, a sound effect for notifying a beginning and an end of an execution control of the one or more applications displayed on the keyboard application execution screen, a sound effect for notifying that there is no running application, a sound effect for notifying of the number of applications displayed on the keyboard application execution screen, a sound effect for a user event, a sound effect for key inputs and a combination thereof generated by the user event on the keyboard, a sound effect for notifying of the number and configuration of keypads for the key inputs and the combination thereof, a sound effect for notifying of an error when the key inputs and the combination thereof do not match a control command, and the like.

The touch screen 130 may perform an input function and a display function. To this end, the touch screen 130 may include a display panel 131 and a touch panel 133.

The display panel 131 displays information input by a user or information to be provided to the user as well as various menus of the user device 100. For example, the display panel 131 may provide various screens according to the use of the electronic device 100, such as a home screen, a screen for composing a message, a screen for displaying received and/or sent text messages, a webpage screen, a telephone call screen, and the like. The display panel may be formed with a Liquid Crystal Display (LCD), an Organic Light Emitted Diode (OLED), an Active Matrix Organic Light Emitted Diode (AMOLED), or the like.

For example, the display panel 131 according to the present disclosure may display icons corresponding to background applications on at least some areas of a keyboard application execution screen driven in the foreground. Furthermore, the display panel 131 may display another application using the keyboard, a similar type of application, an application associated with a currently used application, and the like on the keyboard application execution screen.

A plurality of icons may be arranged in an order in which a user has recently executed them. The display panel 131 may display icons corresponding to applications such that the icons are superposed on the keyboard application execution screen. At this time, the display panel 131 may display the icons translucently or according to transparency set in advance.

One icon may be displayed to be overlapped with one or some of a plurality of keypad blocks configuring the keyboard application execution screen, or may be displayed between the keypad blocks.

Furthermore, the display panel 131 may delete an icon displayed on the keyboard application execution screen according to a user event detected by the controller 110. When one icon is deleted while a plurality of icons is arranged, the remaining icons may be displayed through rearrangement thereof.

Various screens displayed on the display panel 131 will be described below with reference to FIGS. 4 to 7.

The touch panel 133 may be mounted on a front side of the display panel 131, and when a touch input device such as a user's finger, a stylus pen, or an electronic pen contacts or approaches the touch panel, the touch panel 133 may generate a touch event, and may transfer the generated touch event to the controller 110. In detail, the touch panel 133 may recognize the touch event through a change in a physical quantity (e.g., electrostatic capacity, resistance, or the like) caused by the contact or approach of the touch input device, and may transfer the type of touch event and information on the touched position to the controller 110.

The touch may include a tap event in which a touch is made and then released without a movement thereof, a double touch event in which the tap event is made twice within a predetermined period of time, a long touch event in which a touch is maintained for more than a predetermined period of time, a multi-touch event in which touches are made at least six points, and a touch movement event in which a touch is made and then moved to a different position. Furthermore, the touch movement event may include a scroll event that a touch is made and then linearly moved in a specific direction, and a gesture event that a touch is made and then moved in the predefined pattern (e.g., a circular pattern, a triangular pattern, or the like). Since the touch panel 133 as described above is obvious to those skilled in the art to which the present disclosure pertains, a detailed description thereof will be omitted.

In particular, the touch panel 133 according to the present disclosure may sense a user event input to an icon corresponding to at least one application displayed on at least one area of the keyboard application execution screen, and may transfer the sensed user event to the controller 110.

The storage unit 120 may store user data as well as programs utilized for functional operations of the electronic device 100 according to the embodiment of the present disclosure. For example, the storage unit 120 may store a program for controlling overall operations of the electronic device, an Operating System (OS) for booting up the electronic device, application programs utilized for other optional functions of the electronic device, for example, a camera function, an image or video reproduction function, a short range radio communication function, and the like, received text messages, transmitted text messages, and the like. Furthermore, the storage unit 120 may store a key map or menu map for operating the touch screen 130. Here, the key map and the menu map may be configured in various forms. For example, the key map may be a keyboard map, a 3*4 key map, a qwerty key map, or a control key map for operation control of the currently activated application program. Moreover, the menu map may be a menu map for operation control of the currently activated application program.

In particular, the storage unit 120 according to the present disclosure may store a control program which may control another application to be executed without displaying an execution screen corresponding to the other application on the touch screen 130 when a user event for requesting execution control of the other application occurs while keypad blocks which are parts of the keyboard application execution screen are displayed and an icon corresponding to the other application is displayed to correspond to the keypad blocks.

Furthermore, the storage unit 120 may sequentially store applications in an order in which a user has recently executed them. For example, the storage unit 120 may store a plurality of application execution screens as thumbnail images. The stored thumbnail images, when execution control of the background application is requested, may be displayed on the display panel 131 to be superposed on the keyboard application execution screen driven in the foreground. Thereafter, the thumbnail images may disappear by a user command. Alternatively, the thumbnail images may disappear after a preset period of time or after blinkingly (i.e., intermittently) displayed for a predetermined period of time.

In addition, the storage unit 120 may store, as a mapping table, an application control command mapped onto key inputs and a combination thereof generated by a user event defined in advance. The user event may be sorted into various events for execution control, and may be set for each type of application. The user event may be configured in advance by a designer when the electronic device is designed, or may be changed and generated by a user.

For example, the storage unit 120 may map a user event of touching or dragging or tracing, in the clockwise direction, keypad blocks overlapping an icon of a music player driven in the background onto a control command for reproducing the next song by the music player driven in the background, and may store the user event mapped onto the control command.

A user event of touching or dragging or tracing a touch gesture over the keypad blocks overlapping the icon of the music player in the counterclockwise direction may be stored while being mapped onto a control command for pausing or terminating the music player.

In another example, it may be assumed that a text message application is executed in the foreground, and an icon of an instant messenger driven in the background is displayed on an area of a keyboard for composing a message. Here, the text message application and the instant messenger application may be assumed to automatically execute the keyboard application.

A user event input to keypad blocks overlapping the icon of the instant messenger in the clockwise direction may be stored while being mapped onto a control command for copying and pasting data input through composing a message onto a dialogue input window of the instant messenger.

Another user event may be mapped onto a control command for changing a background application to a foreground application.

The controller 110 may control overall operations of the electronic device 100 and a signal flow between internal blocks of the electronic device 100, and may perform a data processing function for processing data. The controller 110 may include a Central Processing Unit (CPU), an Application Processor (AP), and the like.

In particular, the controller 110 according to the present disclosure may display an item corresponding to a first application on an area of an execution screen of a second application, and may detect a user event input to the item to control the first application according to the user event.

For example, the second application may be an application that operates in the foreground and includes a keyboard execution screen, and the first application may be a plurality of applications that is driven in the background or managed by a task manager.

The controller 110 may detect a trace of a touch gesture input to one or more keypad blocks overlapping the item, generate key inputs or a combination thereof according to the trace of the touch gesture, and analyze the key inputs or the combination thereof to extract a control command corresponding to the key inputs or the combination thereof.

Here, the controller 110 may analyze at least one of the types of keypad blocks to which the touch gesture has been input, the number of keypad blocks to which the touch gesture has been input, the order in which the touch gesture has been input to the keypad blocks, the direction in which the touch gesture has been input, or combinations thereof.

The controller 110 may control or terminate execution of the first application according to the control command, change the first application from the background state to the foreground state, or copy and paste data input through the keypad blocks on the execution screen of the second application onto a data input window of the first application.

The controller 110 may display items corresponding to a plurality of first applications in an order in which a user has recently executed them, or may display the order using at least one of a character, a number, or a symbol. Here, when one of the first applications is terminated according to the user event, the item corresponding to the terminated first application may be deleted, and the items corresponding to the remaining first applications may be displayed through rearrangement thereof.

A method of controlling an application using key inputs or a combination thereof by the controller 110 will be described below with reference to FIGS. 9 and 10.

FIGS. 2 to 8 illustrate examples of controlling an application according to the present disclosure.

Figure 2:
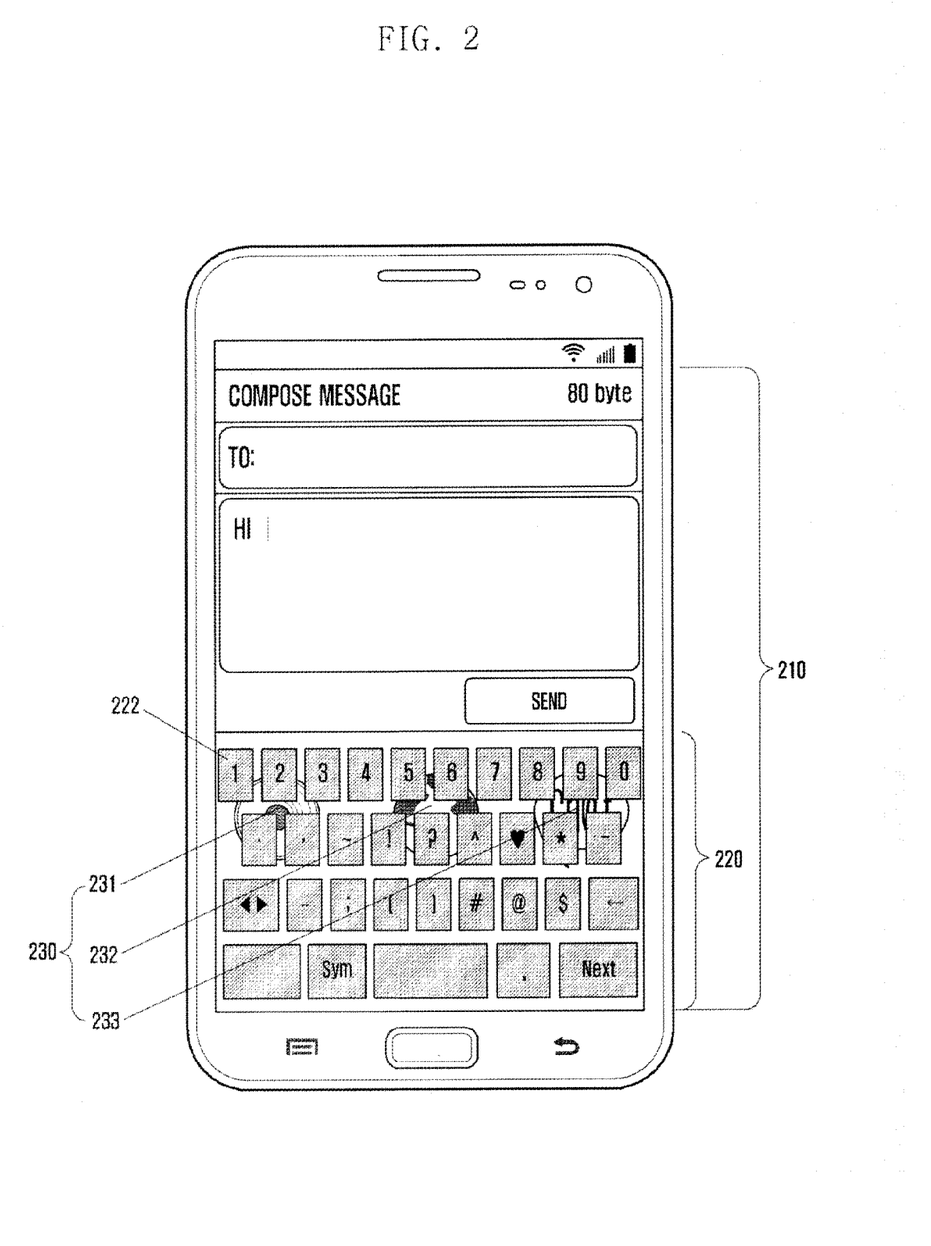
FIG. 2 illustrates examples of an execution screen of an application executed according to the present disclosure.

Referring to FIG. 2, a screen interface for controlling an application according to the present disclosure may be divided into a message application execution screen 210 and a keyboard application execution screen 220 displayed on at least one area of the message application execution screen 210. The keyboard application execution screen 220 may be automatically activated in conjunction with the execution of the message application, and may be diversely arranged on one of a lower area, an intermediate area, and an upper area of the message application execution screen 210 according to settings of a user or designer.

The keyboard application execution screen 220 may include keypad blocks for inputting data corresponding to a user interaction, and the keypad blocks may include common control buttons (e.g., a Backspace button, an Enter button, a Space button, a mode change button, a Shift button, a Caps Lock button, and the like) and character buttons which are allocated characters, respectively, (e.g., numbers, alphabetical characters, and characters of a user's own language). Furthermore, the keyboard application execution screen 220 may further include an item for concealing itself on the full screen although the item is not illustrated.

In particular, the keyboard application execution screen 220 of the present disclosure may display items 230 corresponding to one or more other running applications on some areas thereof.

The items 230 may include, for example, an item 231 for representing a music player application, an item 232 for representing an Internet explorer application, and an item 233 for representing a Social Networking Service (SNS) messenger application. The items 230 may be configured with an icon, an image, a list, or the like for representing each of the applications.

The items 230 may be arranged in an order in which a user has recently used them. In FIG. 2, it may be assumed that the item 231 for representing the music player application, the item 232 for representing the Internet explorer application, and the item 233 for representing the Social Networking Service (SNS) messenger application are arranged in an order in which a user has recently executed them.

FIG. 2 illustrates an example of a screen on which touch areas of keypad blocks 222 and the items or icons 230 are displayed while overlapping each other. In this case, the items 230 may be displayed through a marginal space other than the keypad blocks 222 (e.g., keys of the keypad or keyboard), empty spaces between the keypad blocks, or the like.

Figure 3:
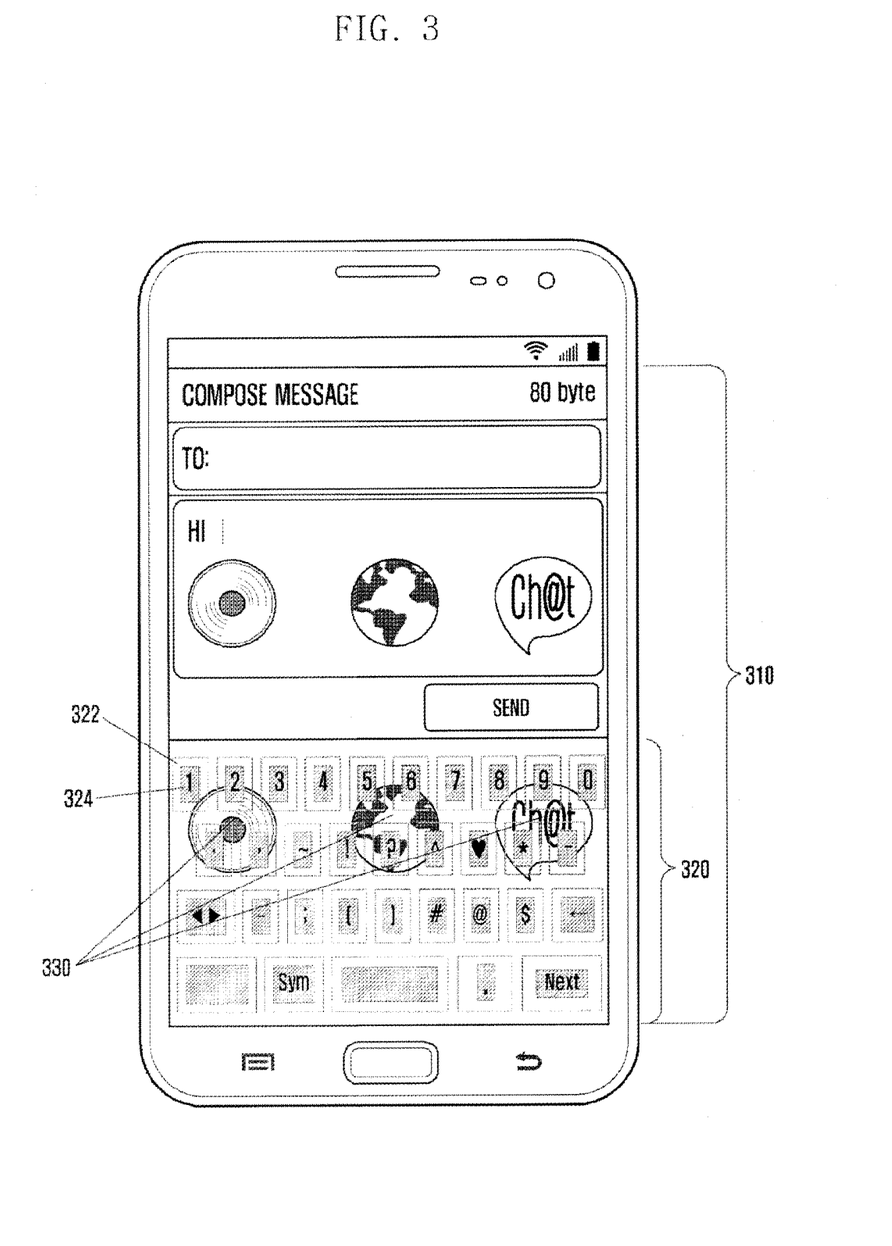
FIG. 3 illustrates examples of an execution screen of an application executed according to the present disclosure.

FIG. 3 illustrates an example in which a base color is used for keypad blocks 322, and parts of the keypad blocks 322 to be pushed are transparent. In this case, as compared with when the keypad blocks 222 illustrated in FIG. 2 are employed, items 330 may be better displayed to a user. Specifically, a boundary area where a key may be pressed may be displayed as a dotted line.

Figure 4:
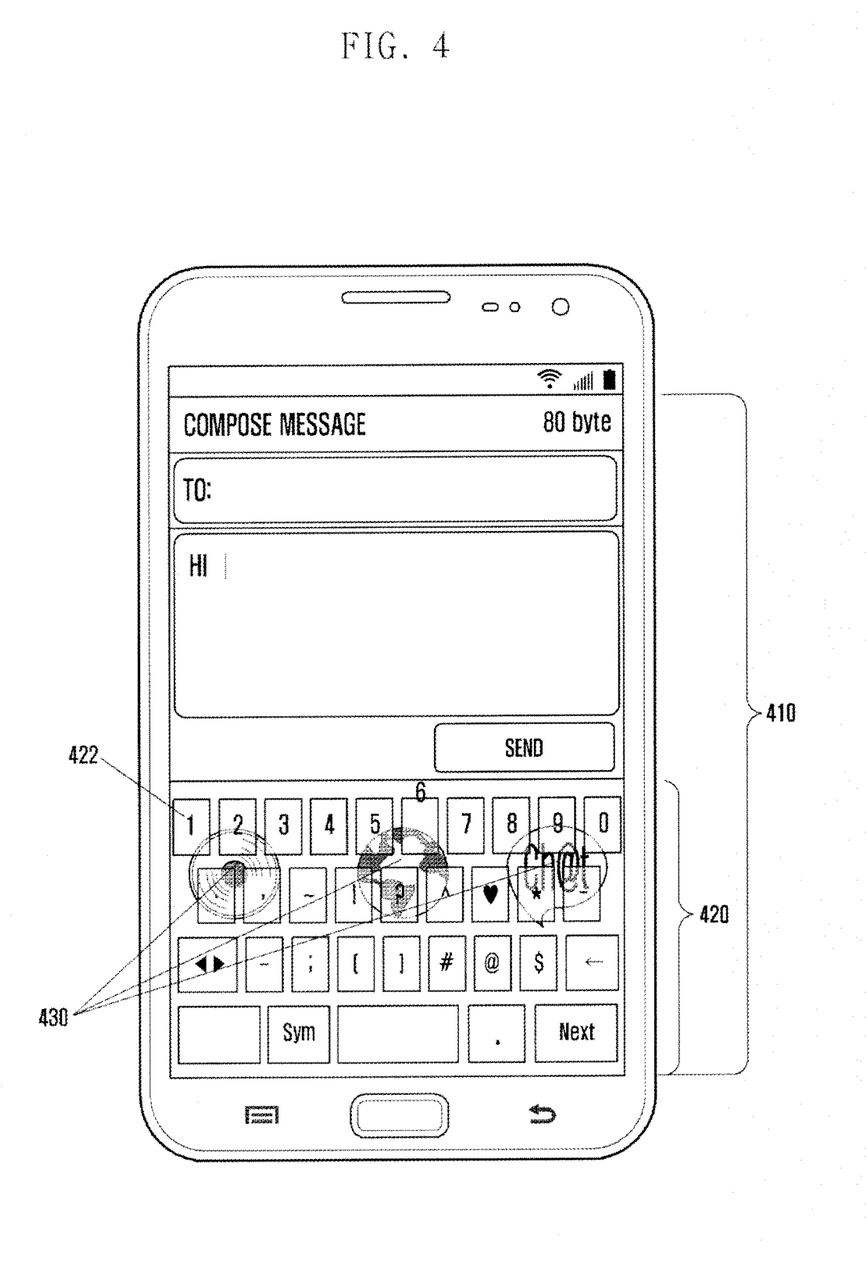
FIG. 4 illustrates examples of an execution screen of an application executed according to the present disclosure.

FIG. 4 illustrates an example in which the remaining area other than a stamp of keypad blocks 422 is transparently displayed so that items 430 are maximumly displayed. That is, although the keypad blocks 422 and the items 430 are displayed while overlapping each other, the items 430 are visible behind the keypad blocks 422.

Figure 5:
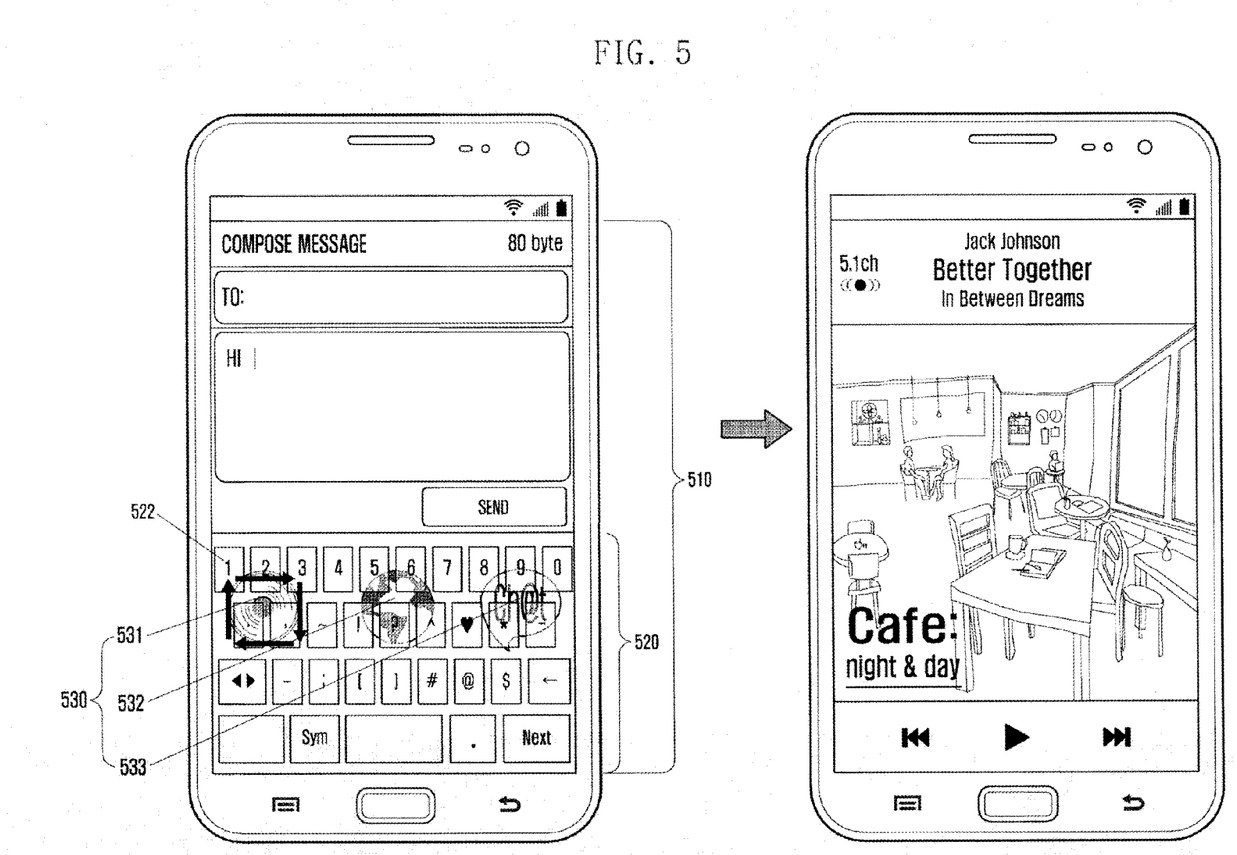
FIG. 5 illustrates examples of a screen for controlling one or more applications displayed on an execution screen of a keyboard application in an electronic device according to the present disclosure

FIG. 5 illustrates an example of a screen for control of one or more applications displayed on a keyboard application execution screen in an electronic device according to the present disclosure.

FIG. 5 illustrates an example of a message composition screen displayed by driving a message application. It may be assumed that the message application is executing in the foreground and a music player corresponding to a music player icon 531, an internet explorer corresponding to an internet explorer icon 532, and an SNS messenger corresponding to an SNS messenger icon 533 are executing in the background at the same time.

Here, in addition to the assumption that the music player icon 531, the internet explorer icon 532, and the SNS messenger icon 533 correspond to the applications driven in the background, they may be configured in advance to correspond to applications frequently used by a user, recently used applications, applications associated with the currently running application, or the like.

While the music player icon 531, the internet explorer icon 532, and the SNS messenger icon 533 are displayed on some areas of a keyboard application execution screen 520, a user may input a touch gesture to keypad blocks overlapping the one icon.

Figure 6:
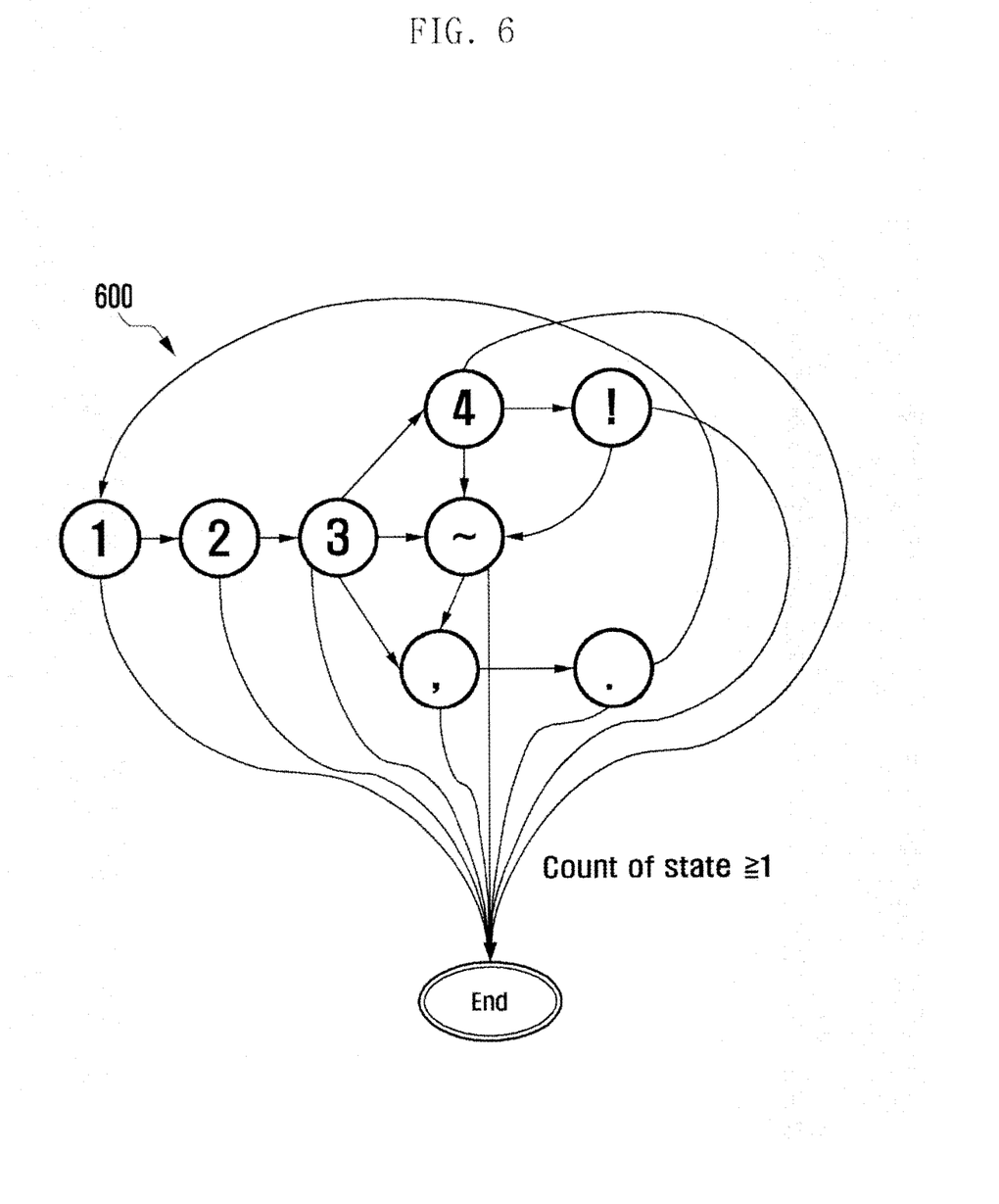
FIG. 6 illustrates examples of a screen for controlling one or more applications displayed on an execution screen of a keyboard application in an electronic device according to the present disclosure

The electronic device 100, through a path diagram as illustrated in FIG. 6, may determine which icon has been selected by key inputs and a combination thereof through the keypad blocks of the keypad application. Here, the key inputs and the combination thereof may correspond to one or more keypad blocks.

For example, when a touch gesture has been continuously input to keypad blocks representing '1', '2', '3', '~', ',', '.', and '1', the electronic device 100 may determine that a user has selected the music player icon 531.

Here, it may be assumed that an electronic device 100 maps the touch gesture input to the keypad blocks overlapping the music player icon 531 in the clockwise direction onto a command for selecting the next sound source in the playlist, and stores the touch gesture mapped onto the command in a mapping table of a storage unit 120. In contrast, the electronic device 100 may map a touch gesture input to the keypad blocks overlapping the music player icon 531 in the counterclockwise direction onto a command for selecting the previous sound source in the playlist, and may store the touch gesture mapped onto the command in the mapping table of the storage unit 120. Furthermore, the electronic device 100 may map in advance a touch gesture in the form of a cross 'X' input to the keypad blocks overlapping the music player icon 531 onto a command for terminating the music player, and may store the touch gesture mapped onto the command in the mapping table of the storage unit 120. In addition, the electronic device 100 may map in advance various touch gestures onto commands for execution control and termination of the music player, and may store the touch gestures mapped onto the commands in the mapping table of the storage unit 120.

Furthermore, the electronic device 100 may map key inputs including keypad blocks neighboring to the music player icon 531 and a combination thereof onto a specific control command, and may store the key inputs and the combination thereof mapped onto the control command in the mapping table of the storage unit, even if the keypad blocks are not necessarily overlapping the music player icon 531. For example, when a touch gesture is input one or more times along a specific path of the path diagram illustrated in FIG. 6, a control command to terminate the corresponding application may be executed.

In FIG. 5, a user sequentially inputs a touch gesture to the keypad blocks representing '1', '2', '3', '~', ',', '.', and '1'. That is, it may be assumed that the user drags keypad blocks overlapped with or neighboring to the music player icon 531 in the clockwise direction.

Here, the user does not necessarily need to input a touch gesture to all of the keypad blocks overlapped with the music player icon 531 (such as, for example, the keypad blocks representing '1', '2', '3', '~', ',', '.', and '1'). The user may omit at least one keypad block or add neighboring keypad blocks that are near, rather than adjacent to or directly overlapping the music player icon 531 (such as, for example, keypad blocks representing '4', '_', ';', and the like) to input a touch gesture to the keypad blocks.

The electronic device 100 may detect the input of the touch gesture, accordingly select the next sound source in the playlist of the music player to extract a control command to change the order of playback, and reproduce the next sound source according to the extracted control command.

As described above, according to the present disclosure, even if not displaying a playback execution screen of the music player on the touch screen, the electronic device 100 may control the music player according to the touch gesture input to the keypad application execution screen overlapped with the music player icon 531. That is, the electronic device 100 may control the music player through the touch screen while driving the music player in the background without displaying the playback execution screen of the music player on the touch screen.

Figure 7:
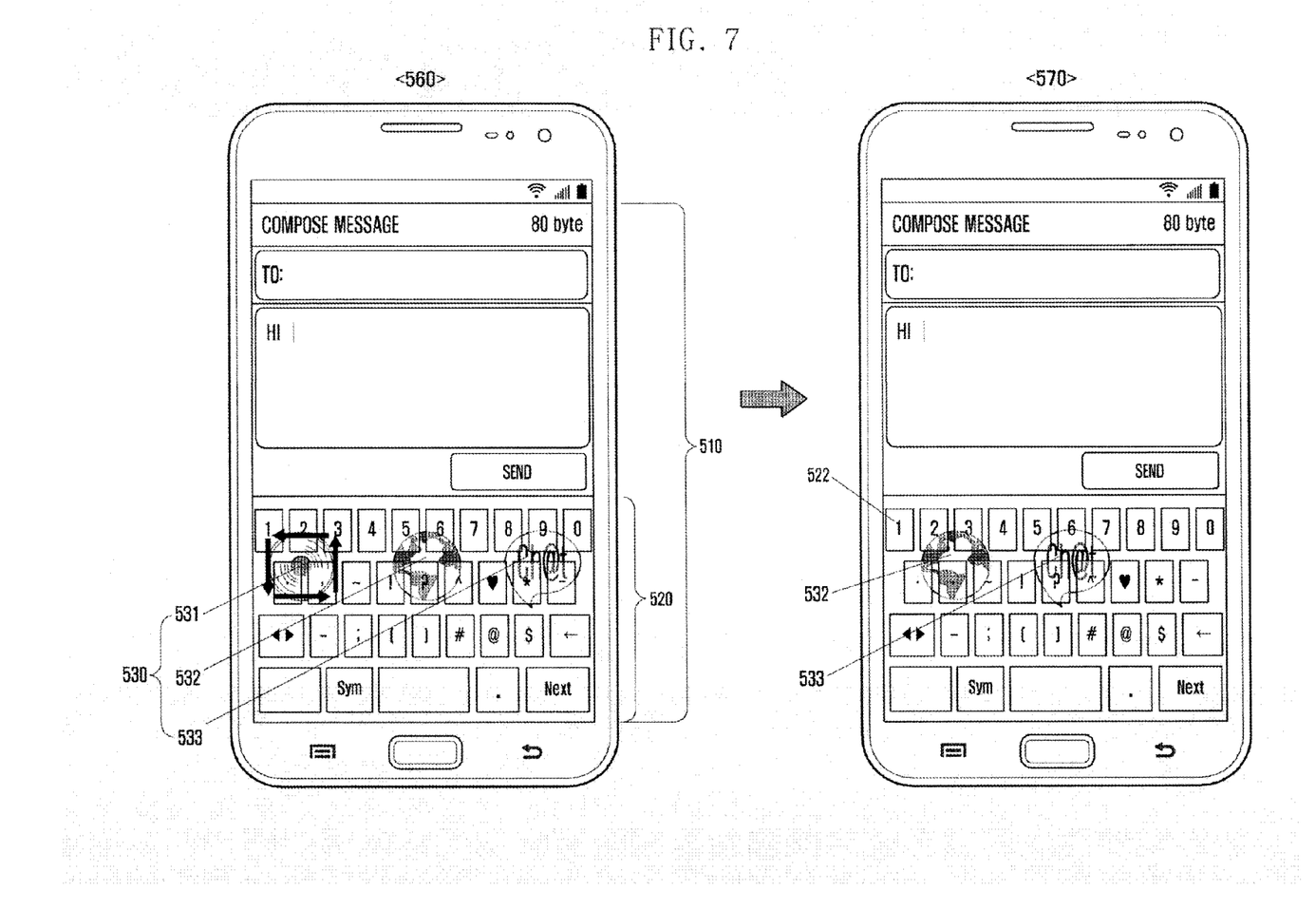
FIG. 7 illustrates examples of a screen for controlling one or more applications displayed on an execution screen of a keyboard application in an electronic device according to the present disclosure

As illustrated in <560> of FIG. 7, a user sequentially inputs a touch gesture to the keypad blocks representing '1', '.', ',', '~', '3', '2', and '1' which are overlapped with or neighboring to the music player icon 531. That is, it may be assumed that the user drags the keypad blocks overlapped with or neighboring to the music player icon 531 in the counterclockwise direction.

The electronic device 100 may detect the input of the touch gesture, accordingly extract a control command to terminate execution of the music player application, and terminate the execution of the music player application according to the extracted control command.

As illustrated in <570> of FIG. 7, the music player icon 531 may be removed from the execution screen when the execution of the music player application is terminated. The remaining icons, namely, the internet explorer icon 532 and the SNS messenger icon 533 may be rearranged on the keyboard application execution screen. At this time, the remaining icons may be rearranged according to the preset rule.

Figure 8:
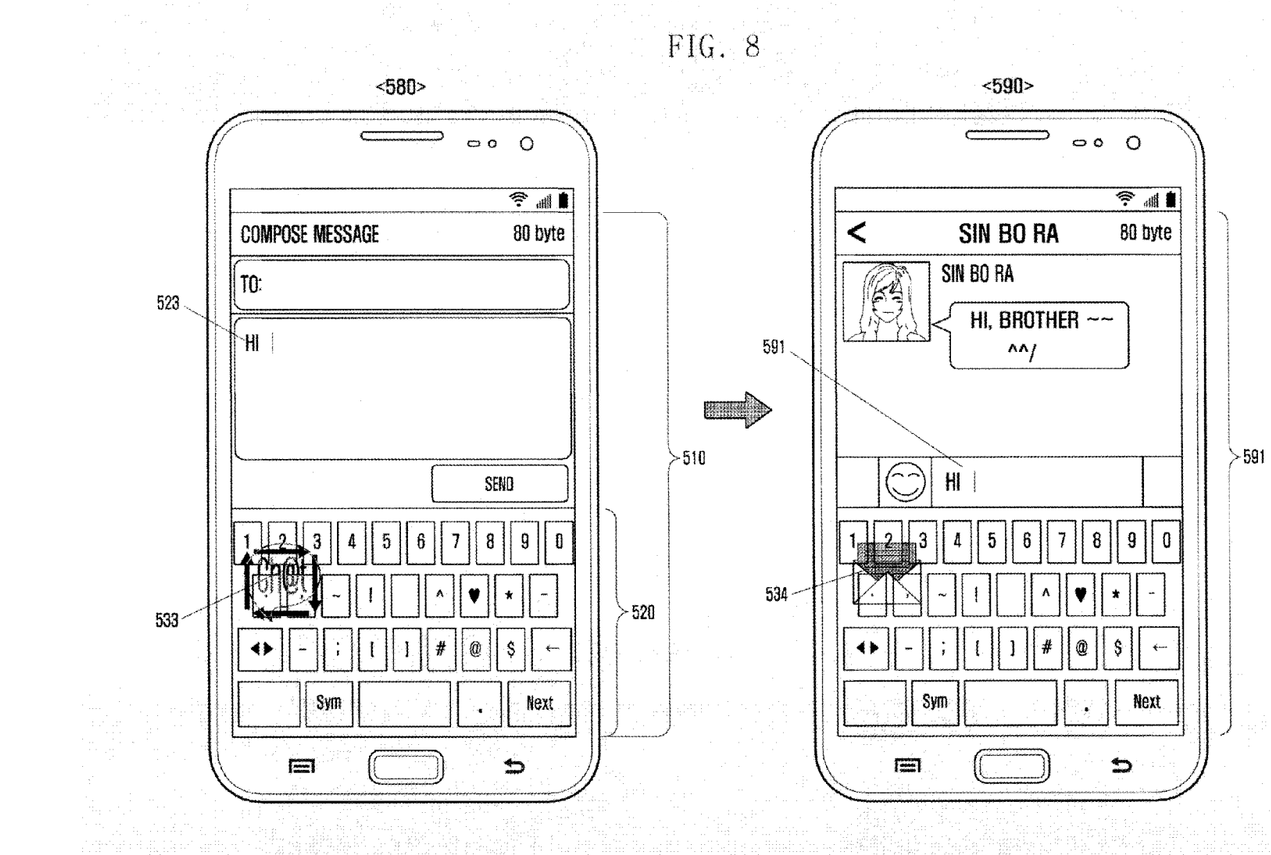
FIG. 8 illustrates examples of a screen for controlling one or more applications displayed on an execution screen of a keyboard application in an electronic device according to the present disclosure.

FIG. 8 illustrates an example of a screen for controlling an application while a keyboard application execution screen is being displayed in an electronic device according to the present disclosure. The keyboard application execution screen may be a keyboard application itself or a keyboard application executed in conjunction with execution of another application.

Specifically, FIG. 8 illustrates an example in which, while a message application and a keyboard application automatically interworked with the message application are being driven, an SNS messenger application is driven together.

Referring to <580> of FIG. 8, when the message application is executed, a data input window and a keyboard application execution screen 520 are displayed as a message composition screen 510 on a display panel where the keyboard application execution screen 520 is located below the data input window, and an SNS messenger icon 533 corresponding to the SNS messenger application is displayed on an area of the keyboard application execution screen 520.

When a user inputs a touch gesture to keypad blocks overlapped with or neighboring to the SNS messenger icon 533 in the clockwise direction, the electronic device 100 may determine that the user has selected the SNS messenger icon 533, and may analyze the touch gesture.

At this time, the electronic device 100 may analyze at least one of the types of keypad blocks to which the touch gesture has been input, the number of keypad blocks to which the touch gesture has been input, the order in which the touch gesture has been input to the keypad blocks, the direction in which the touch gesture has been input, or combinations thereof.

Here, it may be assumed that the electronic device 100 has previously mapped the touch gesture onto a specific control command and has stored the touch gesture mapped onto the control command in a mapping table of a storage unit 120, the touch gesture having been input in the clockwise direction to the keypad blocks overlapped with the icon corresponding to the SNS messenger application on the keyboard application execution screen displayed by the execution of the messenger application.

For example, the control command may be a command to change the SNS messenger application from the background state to the foreground state and the message application from the foreground state to the background state, or to terminate the message application.

Referring to <590> of FIG. 8, according to the detection of the touch gesture, text data such as a string "Hi" input on the message composition screen is automatically copied and pasted onto an input window of the SNS messenger application, and an execution screen of the SNS messenger application is output on the touch screen at the same time.

Figure 9:
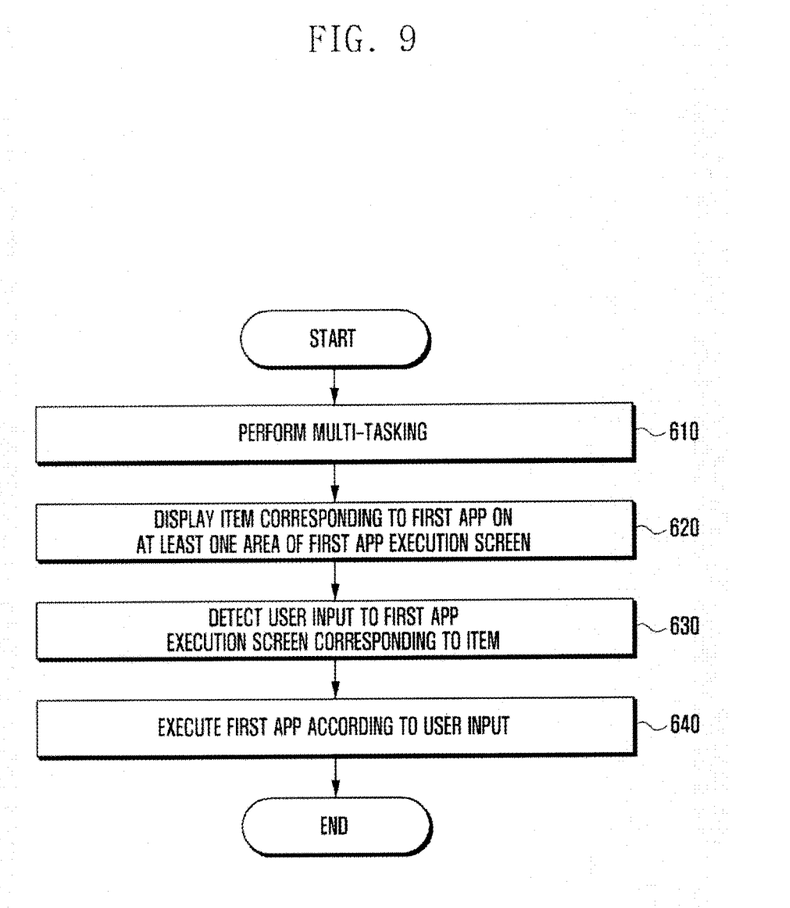
FIG. 9 is a flowchart schematically illustrating a method of controlling an application according to the present disclosure.

FIG. 9 is a flowchart schematically illustrating a method of controlling an application according to the present disclosure.

Referring to FIG. 9, in the method of controlling the application according to the present disclosure, first, a controller 110 performs multi-tasking (step 610).

For example, applications executed through the multi-tasking correspond to a plurality of applications managed by a task manager, and may include a keyboard application or an associated application executing the keyboard application, and at least one of a frequently used application, a recently used application, an application associated with the currently running application, an application using a different keyboard execution screen, or the like.

Next, the controller 110 displays an item corresponding to a first application on at least one area of a second application execution screen (step 620).

Here, the second application execution screen is assumed to be a keyboard application execution screen or an application associated with a keyboard application. The item may be at least one of an image, an icon, a list, or the like representing the first application. The item may be displayed by a selection of a user, or may be automatically displayed on the second application execution screen by a designer. Furthermore, the item may be displayed in a marginal space of the second application execution screen, may be displayed while overlapped with an area of the second application execution screen, may be translucently displayed according to the preset transparency, may be displayed for a preset period of time and then disappear, may be blinkingly displayed, or may be displayed through at least one combination of the aforementioned methods.

Thereafter, the controller 110 detects a user event input to the second application execution screen overlapped with the item (step 630).

For example, the controller 110 may detect a user event input to a part or the entirety of the item, or an area neighboring to the item.

Here, the user event may refer to a touch gesture which a user inputs with an electronic pen or his/her finger. The touch gesture may be configured with at least one or a combination of one or more of a touch, a tap, a press, a drag, a drag and drop, a flick, or a drag and flick.

Here, the touch refers to an action of pressing one point, the tap refers to an action of touching a point with a finger and then releasing the finger from the corresponding point without moving the finger, namely, dropping the finger, the press refers to an action of touching a point with a finger for a relatively longer period of time than the tap and then releasing the finger from the corresponding point without moving the finger, the drag refers to an action of touching a point with a finger and then moving the finger in a predetermined direction, the drag and drop refers to an action of dragging a touch and then releasing a finger, and the flick refers to an action of rapidly moving a finger and then releasing the finger, likewise to flipping though a book. Furthermore, the drag and flick refers to an action of dragging a touch and then performing a flick at a predetermined time point (i.e., an action of continuously performing a drag and a flick in a state where a finger contacts a touch screen).

Then, the controller 110 controls the first application according to the user event (step 640).

Namely, the controller 110 may extract a control command mapped in advance onto the detected user event, and may control the first application according to the extracted control command.

For example, according to the control command, the execution of the first application may be controlled or terminated, or a conversion that the first application is driven in the foreground and the second application is driven in the background may be carried out. Furthermore, the controller 110 may also copy and paste data input by a user onto a data input window of the first application according to the user event while the second application is being executed.

The application control method of the electronic device according to the present disclosure has been briefly described above. Hereinafter, the method of controlling the background application according to the touch gesture input to the execution screen of the keyboard application will be described in more detail.

Figure 10:
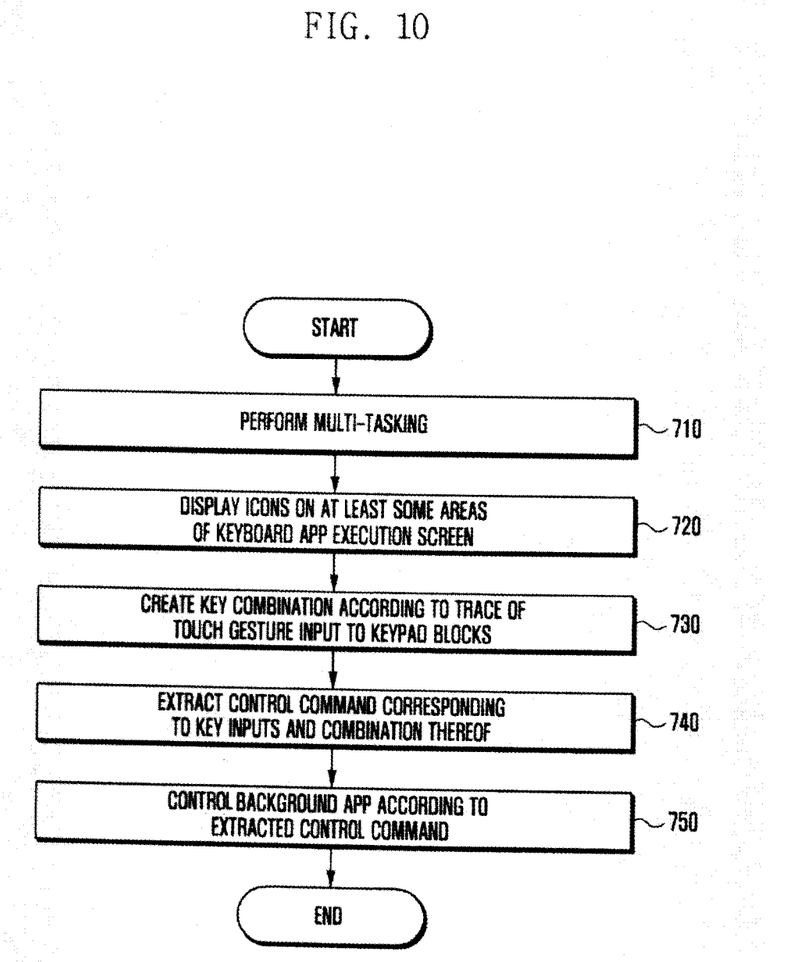
FIG. 10 is a flowchart illustrating a method of controlling an application using key inputs or a combination thereof according to the present disclosure.

FIG. 10 is a flowchart illustrating a method of controlling an application using key inputs or a combination thereof according to the present disclosure.

Referring to FIG. 10, in the method of controlling the application using the key inputs or the combination thereof according to the present disclosure, first, a controller 110 performs multi-tasking (step 710).

For example, the controller 110 may drive a plurality of applications through the performance of the multi-tasking, in which the controller 110 may drive the most recently used application in the foreground and the remaining applications in the background. A second application may be assumed as the application driven in the foreground, and first applications may be assumed as the applications driven in the background.

The second application may be a keyboard application itself or an application including a keyboard application automatically outputting a preset keyboard execution screen while being executed. The associated application executing the keyboard application may be at least one of, for example, a text message application, an SNS messenger application, a memo application, a mail browser application, or the like.

The first application may one or more of various applications such as a music player application, a video player application, a satellite Digital Multimedia Broadcasting (DMB) application, a text message application, an SNS messenger application, a memo application, or the like. Here, while the text message application, the SNS messenger application, and the memo application are being executed, a keyboard application may be output automatically or in response to a user's request.

Next, the controller 110 displays one or more items corresponding to one or more applications on some areas of a keyboard application execution screen (step 720).

At this time, the items may be displayed in a marginal space of the keyboard application execution screen, may be displayed while overlapped with one or more keypad blocks of the keyboard application execution screen, may be displayed while overlapped with the keyboard application execution screen, may be translucently displayed on the keyboard application execution screen according to the preset transparency, may be displayed on the keyboard application execution screen for a preset period of time and then disappear, or may be blinkingly (or intermittently) displayed on at least some areas of the keyboard application execution screen.

The controller 110 may arrange the items on the keyboard application execution screen in an order in which a user has recently executed them, and may display information on the execution order with at least one of a character, a number, or a symbol.

Thereafter, the controller 110 creates key inputs and a combination thereof according to a trace of a touch gesture input to the keyboard (step 730).

Namely, the controller 110 may sense the touch gesture input to one or more keypad blocks of the keyboard application execution screen overlapped with the corresponding item, detect the trace of the touch gesture, and create the key inputs and the combination thereof according to the trace of the detected touch gesture.

The controller 110 may detect one key according to a touch input which is input to one keypad block corresponding to the item, or a combination of keys according to a touch input which is input to two or more keypad blocks corresponding to the item.

The controller 110 may analyze at least one of the types of keypad blocks to which the touch gesture has been input, the order in which the touch gesture has been input to the keypad blocks, the number of keypad blocks to which the touch gesture has been input, the direction in which the touch gesture has been input, or combinations thereof.

Then, the controller 110 analyzes the key inputs created in step 730 and the combination thereof to extract a control command corresponding to the key inputs and the combination thereof (step 740).

That is, the controller 110 may analyze the key inputs and the combination thereof to extract the control command, which has been previously mapped onto the key inputs and the combination thereof and stored, from a control command mapping table of a storage unit 120.

Thereafter, the controller 110 controls execution of an application according to the control command extracted in step 740 (step 750).

That is, according to the extracted control command, the controller 110 may control or terminate the execution of the application, change the background application to the foreground state, or copy and paste data input through the keyboard application onto a data input window of the application.

When the corresponding application is terminated according to the extracted control command, the controller 110 may delete the item corresponding to the terminated application, and may rearrange and display the items corresponding to the remaining applications.

According to the present disclosure, icons corresponding to one or more applications are displayed on some areas of a keyboard application execution screen, thereby improving intuitiveness of a user interface for displaying and controlling other applications while the keyboard application is being driven.

Furthermore, according to the present disclosure, applications corresponding to one or more icons displayed on some areas of a keyboard application execution screen can be simply and rapidly controlled according to key inputs which a user inputs and a combination thereof.

Accordingly, through the keyboard application execution screen, a user can intuitively control the applications corresponding to the icons displayed on the keyboard application execution screen, without passing through separate steps.

Meanwhile, the embodiments disclosed in the specification and drawings are merely presented to easily describe technical contents of the present disclosure and help the understanding of the present disclosure and are not intended to limit the ambit of the present disclosure. It is obvious to those skilled in the art to which the present disclosure pertains that other modified embodiments based on the technical idea of the present disclosure besides the embodiments disclosed herein can be carried out.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method of executing a plurality of applications, the method comprising:
   displaying at least one icon corresponding to a first application on a touch screen;
   displaying, on the touch screen, a second application including an input interface, wherein the at least one icon is overlappingly displayed with a portion of the input interface;
   detecting a touch input on the input interface of the second application that indicates a selection of the at least one icon corresponding to the first application; and
   in response to detecting the touch input, displaying one or more images representative of the first application on the touch screen.

2. The method of claim 1, wherein the input interface comprises displaying a keyboard on the touch screen.

3. The method of claim 2, wherein the displaying the at least one icon comprises at least one of:
   displaying the icon in a marginal space of the keyboard of the second application,
   displaying the icon with at least one key of the keyboard overlapping the icon,
   displaying the icon between at least two keys of the keyboard,
   displaying an execution screen of the second application overlapping the icon,
   displaying the icon translucently on the execution screen of the second application according to a predetermined translucency setting,
   displaying the icon transparently on the execution screen of the second application according to a predetermined transparency setting,
   displaying the icon on the execution screen of the second application for a predetermined period of time and removing the icon from display when the predetermined period of time expires, and
   displaying the icon intermittently on at least a portion of the execution screen of the keyboard.

4. The method of claim 2, wherein the touch input comprises a touch gesture input to at least one key of the keyboard of the second application.

5. The method of claim 4, wherein the touch input further comprises the touch gesture being input to a combination of keys of the keyboard, the combination of keys corresponding to a location of the icon displayed on the touch screen.

6. The method of claim 2, wherein the touch input comprises a touch gesture tracing through a plurality of keys of the keyboard that are displayed as overlapping the icon; and analyzing the touch gesture to extract a control command to execute the first application.

7. The method of claim 6, wherein the analyzing touch gesture comprises at least one of:
   analyzing types of the plurality of keys through which the touch gesture was traced,
   analyzing an order in which the touch gesture traced through the plurality of keys,
   analyzing a number of the plurality of keys which the touch gesture was traced through, and
   analyzing a direction in which the touch gesture was traced.

8. The method of claim 2, wherein displaying one or more images representative of the first application comprises executing the first application and at least one of:
   terminating execution of the second application when the first application is executed;
   changing the first application from a background execution state to a foreground execution state; and
   copying and pasting data input through the keyboard onto a data input window of the first application when the first application is executed.

9. The method of claim 1, wherein the first application comprises at least one of:
   an application executing in a background execution state,
   an application managed by a task manager application, and
   an application associated with the second application.

10. The method of claim 1, wherein displaying the icon further comprises:

displaying a plurality of icons corresponding to a plurality of first applications according to an order in which each application has recently been executed; and
visually indicating the order by displaying at least one of a character, a number, and a symbol.

11. The method of claim 10, further comprising:
when one first application of the plurality of first applications is terminated, deleting an icon corresponding to the terminated first application; and rearranging and displaying icons corresponding to the first applications and the second application.

12. A method of executing a plurality of applications, comprising:
displaying at least one icon on a touch screen corresponding to a first application, wherein the at least one icon is overlappingly displayed with a portion of a keyboard of a second application currently displayed on the touch screen;
detecting a touch gesture input on the keyboard of the second application that indicates a selection of the at least one icon corresponding to the first application; and
in response to detecting the touch gesture input, executing at least one of a function of the keyboard and displaying one or more images representative of the first application on the touch screen.

13. A mobile terminal, comprising:
a touch screen configured to display at least one icon corresponding to a first application and to display a second application including an input interface, wherein the at least one icon is overlappingly displayed with a portion of the input interface; and
a controller configured to detect a touch input on the input interface of the second application that indicates a selection of the at least one icon corresponding to the first application, and
in response to detecting the touch input, displaying one or more images representative of the first application on the touch screen.

14. The mobile terminal of claim 13, wherein the input interface comprises a keyboard on the touch screen.

15. The mobile terminal of claim 14, wherein the first application comprises at least one of:
an application executing in a background execution state,
an application managed by a task manager application, and
an application associated with the second application.

16. The mobile terminal of claim 14, wherein the display of the at least one icon comprises at least one of:
displaying the icon in a marginal space of the keyboard of the second application,
displaying the icon with at least one key of the keyboard overlapping the icon,
displaying the icon between at least two keys of the keyboard,
displaying an execution screen of the second application overlapping the icon, displaying the icon translucently on the execution screen of the second application according to a predetermined translucency setting,
displaying the icon transparently on the execution screen of the second application according to a predetermined transparency setting,
displaying the icon on the execution screen of the second application for a predetermined period of time and removing the icon from display when the predetermined period of time expires, and
displaying the icon intermittently on at least a portion of the execution screen of the keyboard.

17. The mobile terminal of claim 16, wherein the controller is further configured to detect a touch gesture tracing through a plurality of keys of the keyboard that are displayed as overlapping the at least one icon; and analyze the touch gesture to extract a control command to execute the first application.

18. The mobile terminal of claim 17, wherein analyzing the touch gesture further comprises at least one of analyzing types of the plurality of keys through which the touch gesture was traced, analyzing an order in which the touch gesture traced through the plurality of keys, analyzing a number of the plurality of keys which the touch gesture was traced through, and analyzing a direction in which the touch gesture was traced.

19. The mobile terminal of claim 14, wherein displaying one or more images representative of the first application comprises executing the first application and at least one of:
terminating execution of the second application when the first application is executed;
changing the first application from a background execution state to a foreground execution state; and
copying and pasting data input through the keyboard onto a data input window of the first application when the first application is executed.

20. The mobile terminal of claim 13, wherein when one first application of a plurality of first applications is terminated, deleting an icon corresponding to the terminated first application; and rearranging and displaying icons corresponding to the first applications and the second application.

21. A mobile terminal, comprising:
a touch screen configured to display on a touch screen at least one icon corresponding to a first application, wherein the at least one icon is overlappingly displayed with a portion of a keyboard of a second application currently displayed on the touch screen; and
a controller configured to detect a touch gesture input on the keyboard of the second application that indicates a selection of the at least one icon corresponding to the first application; and
in response to detecting the touch gesture input, execute at least one of a function of the keyboard and displaying one or more images representative of the first application on the touch screen.

* * * * *